United States Patent
Yamashita et al.

(10) Patent No.: US 11,472,341 B2
(45) Date of Patent: Oct. 18, 2022

(54) VEHICLE DOOR MIRROR

(71) Applicant: KABUSHIKI KAISHA HONDA LOCK, Miyazaki (JP)

(72) Inventors: Takehito Yamashita, Miyazaki (JP); Masakazu Tada, Miyazaki (JP)

(73) Assignee: Kabushiki Kaisha Honda Lock, Miyazaki (JP)

(*) Notice: Subject to any disclaimer, the term of this patent is extended or adjusted under 35 U.S.C. 154(b) by 183 days.

(21) Appl. No.: 17/088,054

(22) Filed: Nov. 3, 2020

(65) Prior Publication Data

US 2021/0188171 A1 Jun. 24, 2021

(30) Foreign Application Priority Data

Dec. 24, 2019 (JP) .............................. JP2019-232291

(51) Int. Cl.
*B60R 1/06* (2006.01)
*B60R 1/074* (2006.01)

(52) U.S. Cl.
CPC ............... *B60R 1/06* (2013.01); *B60R 1/074* (2013.01)

(58) Field of Classification Search
CPC ........... B60R 1/06; B60R 1/072; B60R 1/074
USPC ......................................... 359/841, 871, 877
See application file for complete search history.

(56) References Cited

U.S. PATENT DOCUMENTS

| 8,328,373 | B2* | 12/2012 | Kawamura | B60R 1/06 |
| | | | | 359/841 |
| 8,696,146 | B2* | 4/2014 | Iba | B60R 1/072 |
| | | | | 359/872 |
| 8,858,002 | B2* | 10/2014 | Suzuki | B60R 1/072 |
| | | | | 359/872 |
| 2004/0021962 | A1* | 2/2004 | Ishigami | B60R 1/06 |
| | | | | 359/871 |
| 2006/0214859 | A1* | 9/2006 | Ide | H01Q 1/3266 |
| | | | | 343/895 |
| 2019/0031103 | A1* | 1/2019 | Yoshida | B60R 1/07 |
| 2019/0031123 | A1* | 1/2019 | Yoshida | B60R 1/07 |
| 2019/0077317 | A1* | 3/2019 | Muto | B60R 1/072 |
| 2019/0275944 | A1* | 9/2019 | Fujisaki | B60R 1/072 |
| 2019/0359138 | A1* | 11/2019 | Yoshida | B60R 1/074 |
| 2020/0148117 | A1* | 5/2020 | Fujisaki | B60R 1/072 |

FOREIGN PATENT DOCUMENTS

JP 4122685 B2 7/2008

* cited by examiner

*Primary Examiner* — Ricky D Shafer
(74) *Attorney, Agent, or Firm* — Carrier Blackman & Associates, P.C.; Joseph P. Carrier; William D. Blackman

(57) ABSTRACT

In a vehicle door mirror, bottomed first and second tubular parts are provided integrally with a base plate portion of an end wall so as to protrude to a mirror side and a cover side from the base plate portion, the first tubular parts having first recesses formed therein respectively, the first recesses opening to the cover side, the second tubular parts having second recesses formed therein respectively, the second recesses opening to the mirror side, the first recesses and the second recesses being arranged alternately, and peripheral walls of the alternately arranged first tubular parts and second tubular parts are formed integrally and continuously with each other such that wall parts, that are part of the peripheral walls and respectively disposed between the alternately arranged first recesses and second recesses, are formed so as to be common to the first tubular parts and the second tubular parts.

2 Claims, 6 Drawing Sheets

VEHICLE DOOR MIRROR

CROSS REFERENCE TO RELATED APPLICATIONS

The present application claims priority under 35 U.S.C. § 119 to Japanese Patent Application No. 2019-232291 filed Dec. 24, 2019 the entire contents of which are hereby incorporated by reference.

BACKGROUND OF THE INVENTION

Field of the Invention

The present invention relates to a vehicle door mirror, comprising a mirror housing that is to be disposed on each of front side doors of a vehicle and includes a resin-made housing main body and at least one cover, the housing main body including a mirror housing recess formed therein and an end wall having a flat base plate portion, an end part, on a side opposite to an opening end, of the mirror housing recess being closed by the end wall, the at least one cover covering the housing main body from the side opposite to the opening end of the mirror housing recess, a mirror facing the base plate portion and being housed in the mirror housing recess.

Description of the Related Art

Such a vehicle door mirror is known from for example Japanese Patent No. 4122685, and in this arrangement in order to enhance rigidity of a resin-made housing main body and suppress vibrations of a mirror housing and a mirror, ribs are integrally protruded from an end wall, facing the mirror, of the housing main body, the ribs protruding to a side opposite to the mirror and being connected in a lattice shape with each other.

However, in the structure disclosed in Japanese Patent No. 4122685, the narrow ribs protrude relatively largely from the end wall of the housing main body, thereby causing the problems as shown in the following (1) to (3): (1) the mirror housing and consequently the door mirror itself increase in size; (2) in a mold for molding the housing main body, it is necessary to form narrow grooves for forming the ribs, and therefore processing of the mold becomes difficult, so that moldability of the housing main body is deteriorated; and (3) when molding the housing main body, it takes time for a resin to be penetrated into the grooves of the mold, thereby requiring a long molding time of the housing main body.

SUMMARY OF THE INVENTION

The present invention has been accomplished in light of such circumstances, and it is an object thereof to provide a vehicle door mirror that is capable of enhancing processability of a mold for molding a housing main body so as to enhance moldability of the housing main body, reducing a molding time of the housing main body, and improving rigidity of the housing main body while suppressing increase in size of the housing main body.

In order to achieve the object, according to a first aspect of the present invention, there is provided a vehicle door mirror, comprising a mirror housing that is to be disposed on each of front side doors of a vehicle and includes a resin-made housing main body and at least one cover, the housing main body including a mirror housing recess formed therein and an end wall having a flat base plate portion, an end part, on a side opposite to an opening end, of the mirror housing recess being closed by the end wall, the at least one cover covering the housing main body from the side opposite to the opening end of the mirror housing recess, a mirror facing the base plate portion and being housed in the mirror housing recess, wherein bottomed first tubular parts and bottomed second tubular parts are provided integrally with the base plate portion of the end wall, the first tubular parts having first recesses formed therein respectively and protruding to the mirror side and the cover side from the base plate portion, the first recesses opening to the cover side, the second tubular parts having second recesses formed therein respectively and protruding to the mirror side and the cover side from the base plate portion, the second recesses opening to the mirror side, the first recesses and the second recesses being arranged alternately, and peripheral walls of the alternately arranged first tubular parts and second tubular parts are formed integrally and continuously with each other such that wall parts, that are part of the peripheral walls and respectively disposed between the alternately arranged first recesses and second recesses, are formed so as to be common to the first tubular parts and the second tubular parts.

In accordance with the first aspect of the present invention, the first tubular parts having the first recesses formed therein respectively and the second tubular parts having the second recesses formed therein respectively are provided integrally with the flat base plate portion of the end wall so as to protrude to the mirror side and the cover side from the base plate portion, the first recesses opening to the cover side, the second recesses opening to the mirror side, and the first recesses and the second recesses being arranged alternately. The wall parts, disposed respectively between the first recesses and the second recesses, of the peripheral walls of the first tubular parts and the second tubular parts are common to the first tubular parts and the second tubular parts. Therefore, while securing rigidity of the housing main body, it is possible to suppress increase in size of the housing main body and consequently the door mirror by making relatively small a protrusion amount of the first and second tubular parts protruding from the base plate portion, and as a result, it is possible to achieve weight reduction and space saving of the door mirror, thereby obtaining an effect of fuel economy being improved in accordance with enhanced aerodynamic performance of the vehicle. Moreover, the width of the first and second recesses can be made relatively large, and it is not necessary to form any narrow and deep groove in a mold for molding the housing main body, thereby improving processability of the mold. Furthermore, the first and second recesses can be made to have substantially the same depth from the base plate portion, so as to make a resin penetrate smoothly into the mold and reduce a molding time of the housing main body, thereby enabling moldability of the housing main body to be enhanced.

According to a second aspect of the present invention, in addition to the first aspect, a mirror angle adjusting unit for adjusting an angle of the mirror in up-down and left-right directions is mounted on the end wall, and the first tubular parts and the second tubular parts are provided integrally with the base plate portion and disposed around the mirror angle adjusting unit so as to be alternately connected with each other.

In accordance with the second aspect of the present invention, since the first tubular parts and the second tubular parts are provided integrally with the base plate portion and disposed around the mirror angle adjusting unit, which is mounted on the end wall, so as to be alternately connected with each other, the rigidity of the housing main body can be further enhanced.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to the attached FIG. 1 to FIG. 6. In the descriptions below, "front and rear" shows a front-rear direction of a vehicle in a state in which a door mirror is in a raised position where the door mirror projects sidewardly from a closed front side door.

Figure 1:
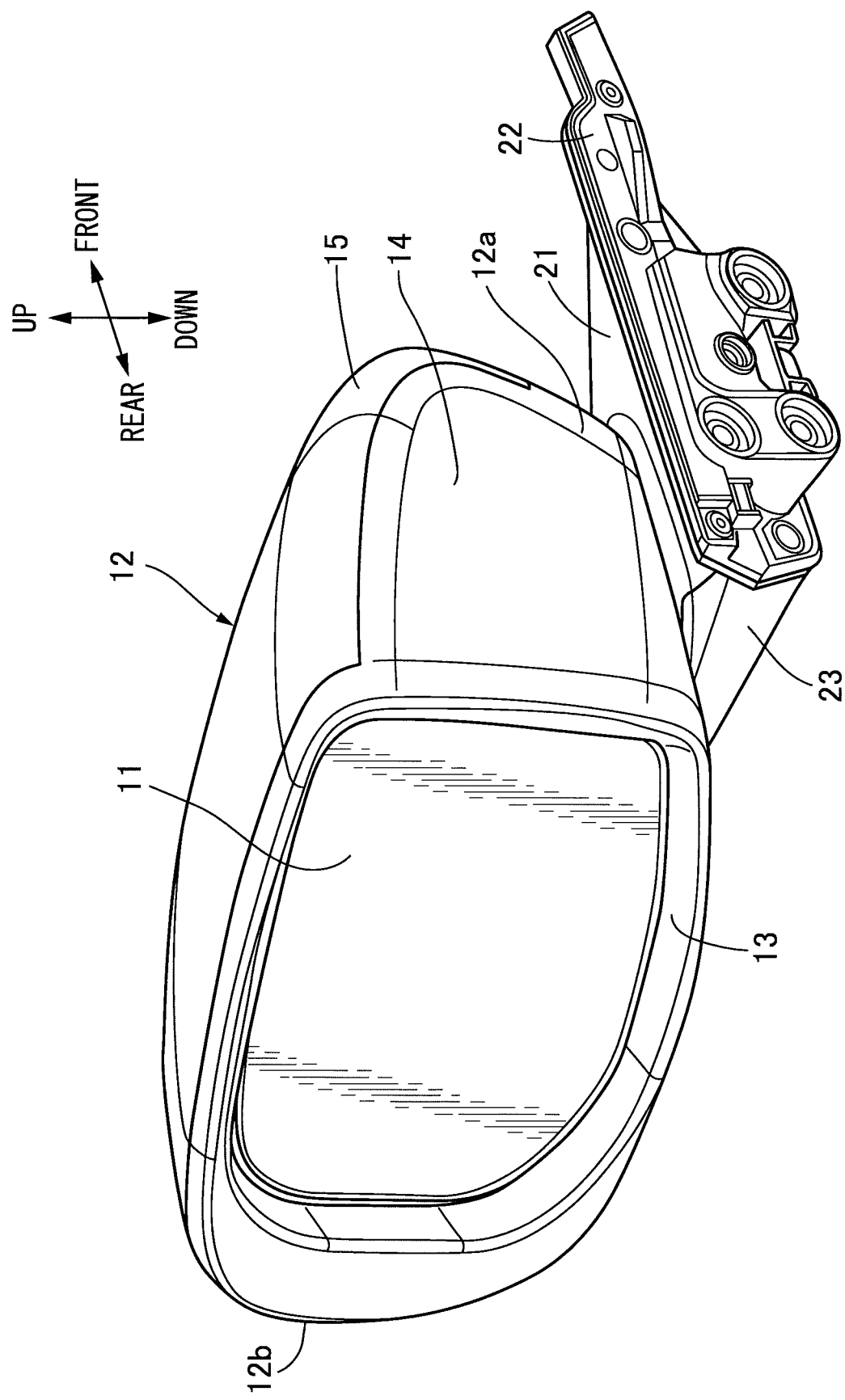
FIG. 1 is a perspective view of a vehicle door mirror in a raised position when viewed obliquely from the rear.
Figure 2:
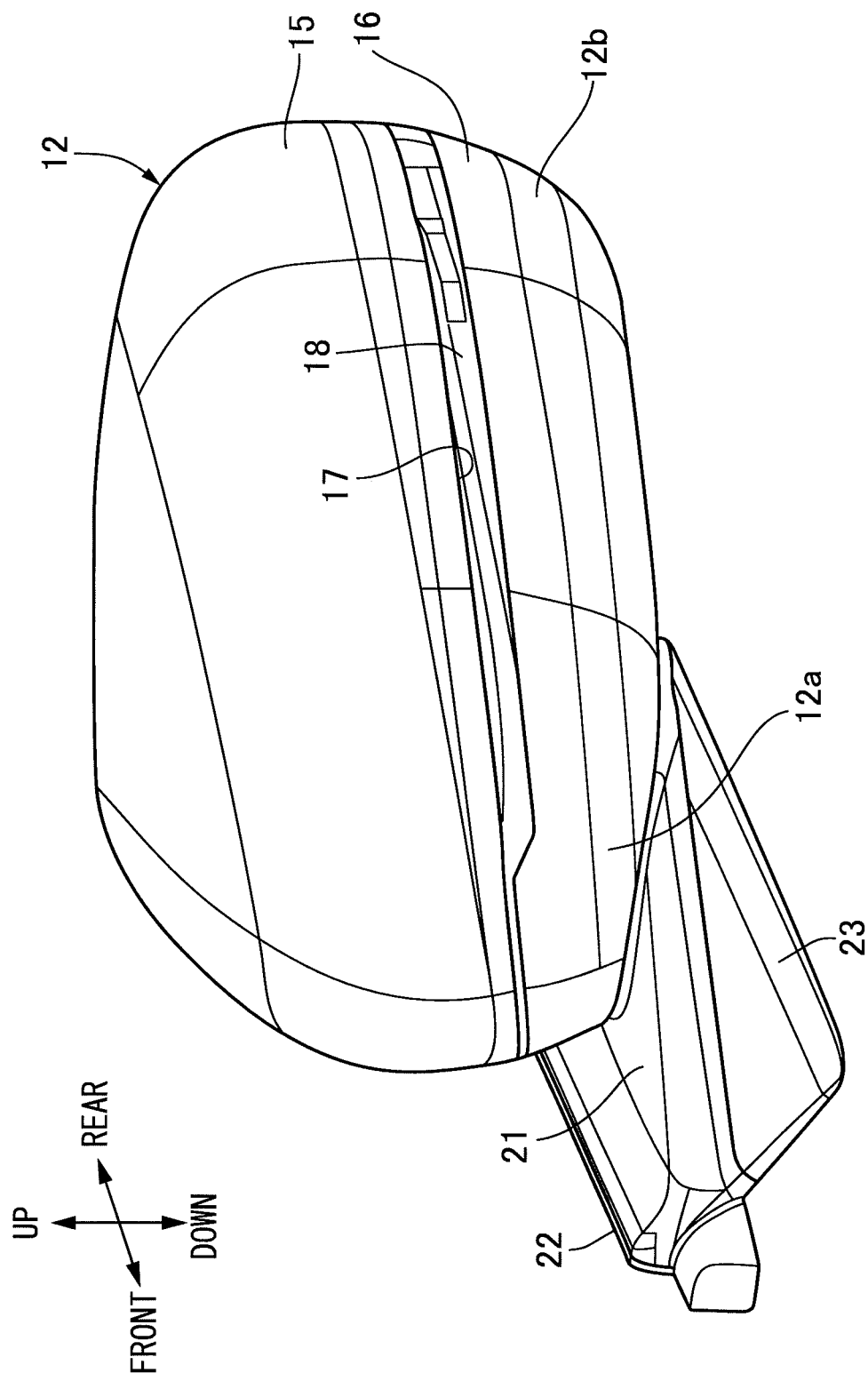
FIG. 2 is a perspective view of the vehicle door mirror in the raised position when viewed obliquely from the front.
Figure 3:
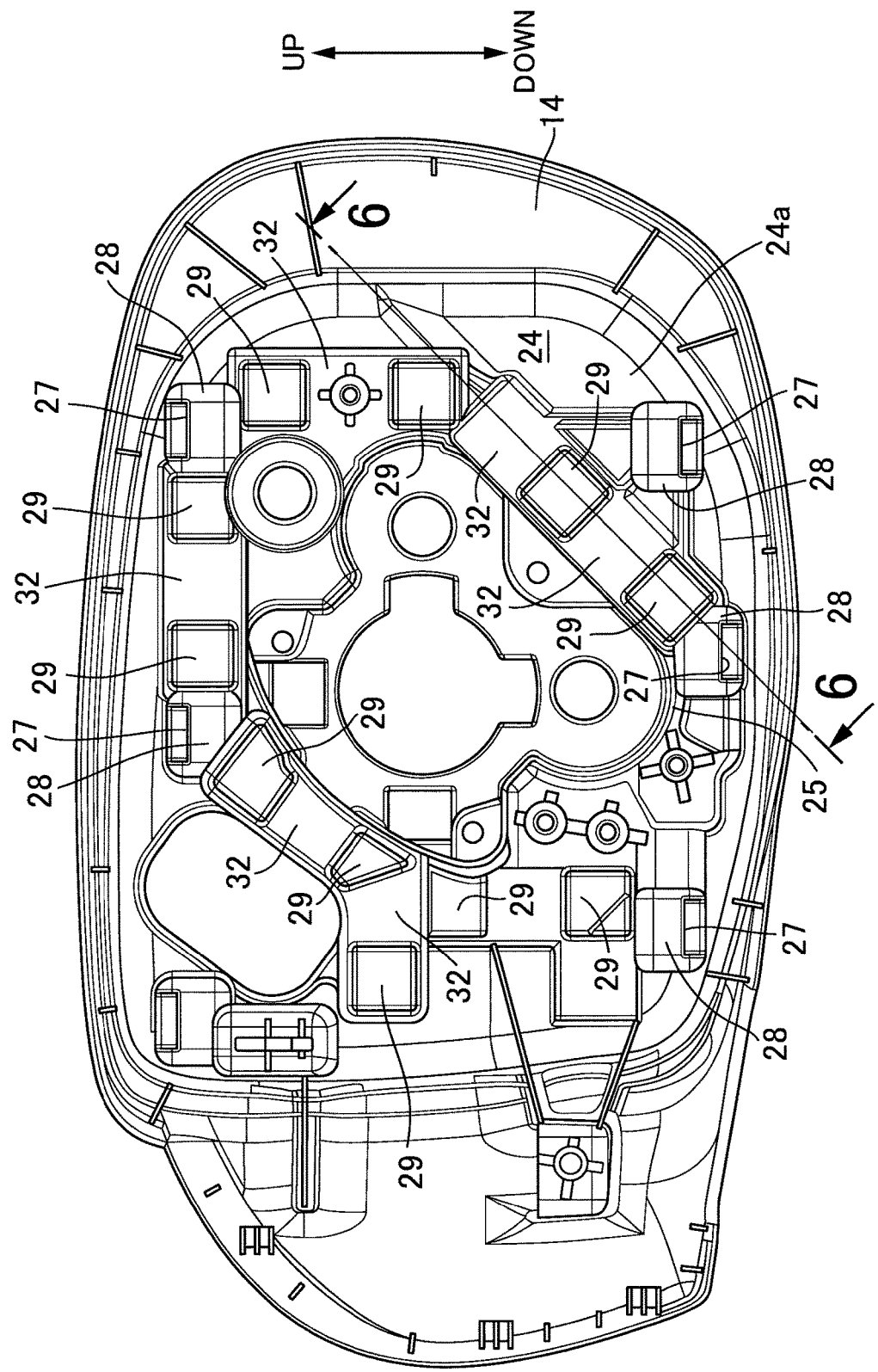
FIG. 3 is a front view, as viewed from the front, of a housing main body in a state in which the vehicle door mirror is in the raised position.
Figure 4:
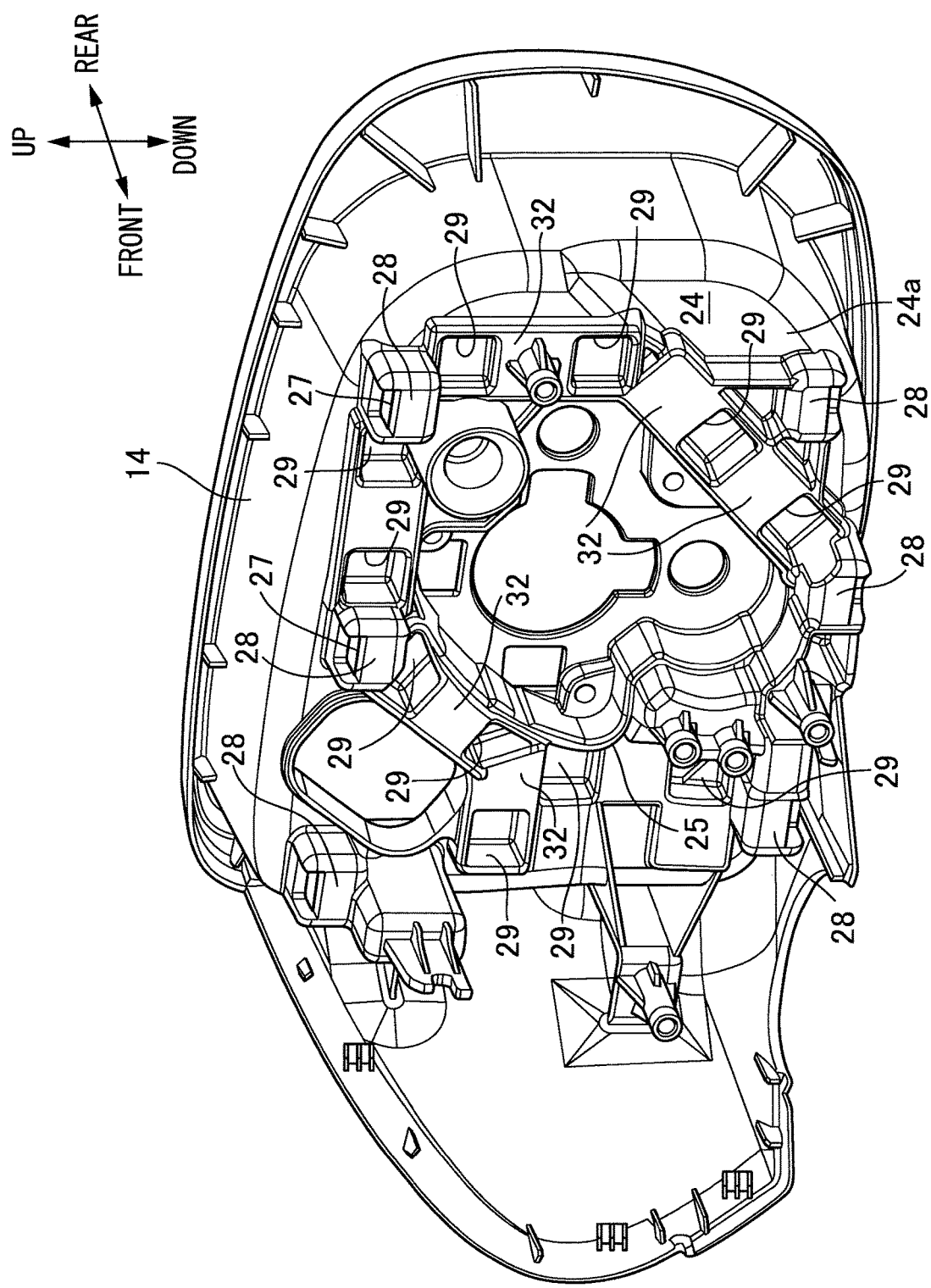
FIG. 4 is a perspective view, as viewed obliquely from the front, of the housing main body in the state in which the vehicle door mirror is in the raised position.
Figure 5:
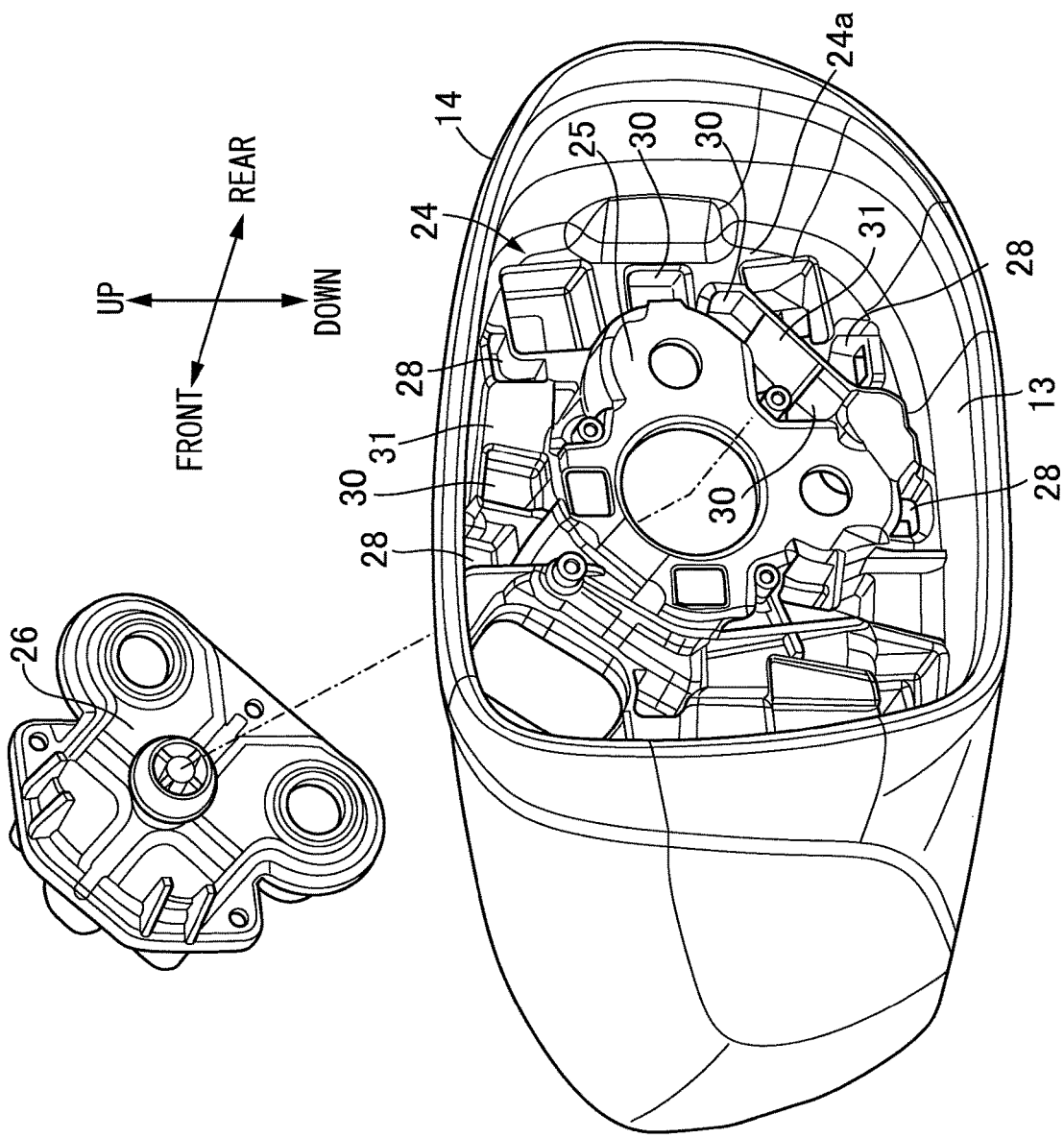
FIG. 5 is an exploded perspective view, as viewed obliquely from the rear, of the housing main body and a mirror angle adjusting unit in the state in which the vehicle door mirror is in the raised position.
Figure 6:
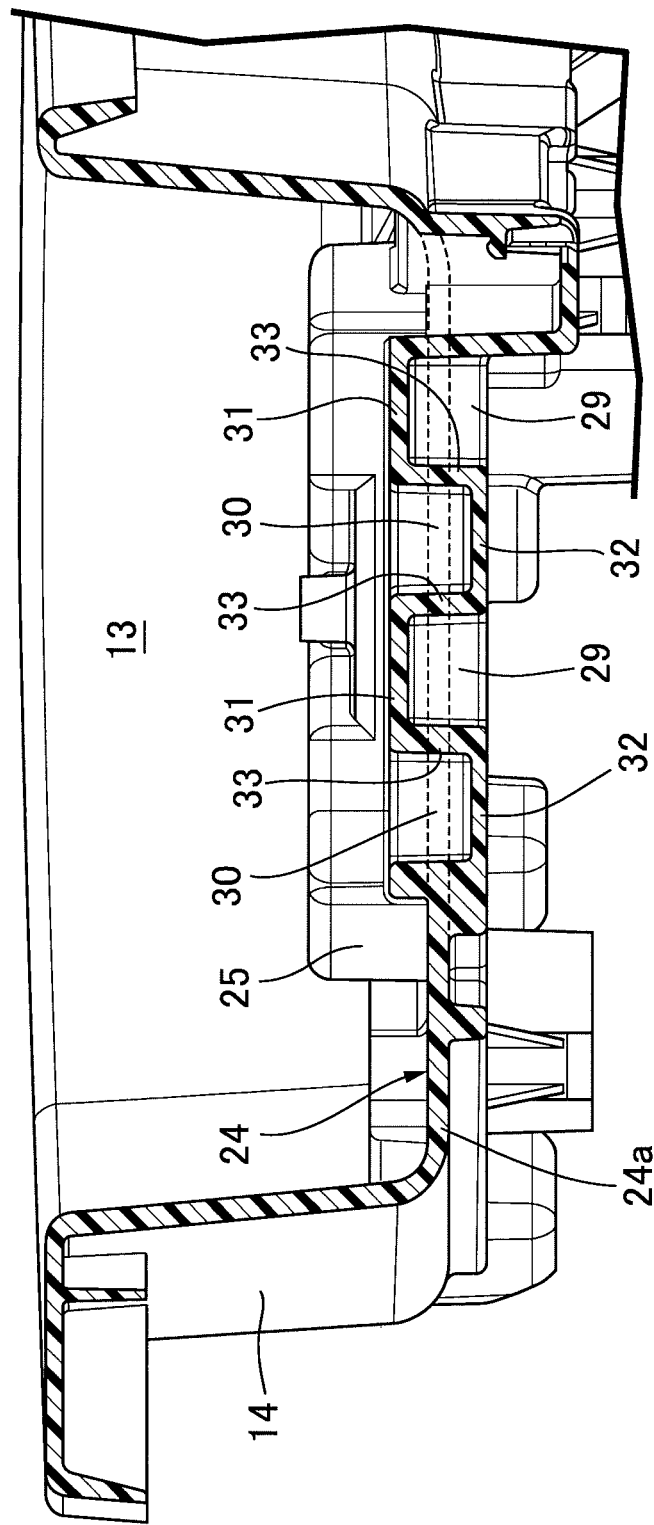
FIG. 6 is a sectional view along 6-6 line in FIG. 3.

First, in FIG. 1 and FIG. 2, left and right front side doors in a passenger vehicle are provided with a mirror housing 12, into which a mirror 11 for viewing to the rear of the vehicle is fitted, so that the mirror housing 12 can pivot between a raised position in which the mirror housing 12 projects sidewardly from the front side door and a retracted position in which the mirror housing 12 is retracted toward the front side door.

The mirror housing 12 includes a housing main body 14, made of a resin, having a mirror housing recess 13 housing the mirror 11, and at least one cover covering the housing main body 14 from a side opposite to an opening end of the mirror housing recess 13. In this embodiment, the mirror housing 12 includes the housing main body 14, and an upper cover 15 and a lower cover 16 that are two covers, made of a resin, covering the housing main body 14 from the side opposite to the opening end of the mirror housing recess 13, the upper cover 15 being formed so as to cover an upper part of the housing main body 14, the lower cover 16 being formed so as to cover a lower part of the housing main body 14.

A slit 17 for a lamp is formed between the upper cover 15 and the lower cover 16, and a side turn lamp 18 is housed within the mirror housing 12, part of the side turn lamp 18 facing the slit 17.

The mirror 11 is retained by a mirror holder, which is not illustrated, and the mirror 11 retained by the mirror holder is disposed in an opening of the housing main body 14, that is, an opening end part of the mirror housing recess 13.

A base member 21 made of a resin is mounted on the front side door so that a seat base 22 made of a resin is disposed between the base member 21 and the front side door, and a base end portion 12a of the mirror housing 12 is pivotably supported on the base member 21 at a position spaced outward from the front side door. A base cover 23, made of a resin, covering the base member 21 from below is detachably mounted on the base member 21.

An electric retraction unit (not illustrated) is housed within the mirror housing 12, and by the electric retraction unit, the mirror housing 12 can pivot between the raised position, in which a tip end portion 12b of the mirror housing 12 is projected sidewardly from the front side door, and the retracted position, in which the mirror housing 12 is retracted toward the front side door.

Referring to FIG. 3 to FIG. 6 in addition, the housing main body 14 is provided with an end wall 24 that closes an end part, on the side opposite to the opening end, of the mirror housing recess 13. The end wall 24 includes a flat base plate portion 24a facing the mirror 11 that is retained by the holder and housed in the mirror housing recess 13.

A bottomed mounting tube part 25 is provided integrally with a substantially central part of the base plate portion 24a of the end wall 24 so as to open to the upper cover 15 and lower cover 16 side, the mounting tube part 25 protruding slightly toward a side opposite to the mirror 11 from the base plate portion 24a while bulging toward the mirror 11 within the mirror housing recess 13 from the base plate portion 24a. A mirror angle adjusting unit 26 is housed in the mounting tube part 25 from the upper cover 15 and lower cover 16 side, and pivots the mirror holder retaining the mirror 11 in left-right and up-down directions, the mirror angle adjusting unit 26 being fixed to the mounting tube part 25 by screwing, etc.

The upper cover 15 and the lower cover 16 are engaged with the housing main body 14, and a plurality of latching parts 28 respectively having through holes 27 are protruded integrally from the housing main body 14, engaging claws (not illustrated) of the upper cover 15 and the lower cover 16 passing through the through holes 27 respectively.

Bottomed first tubular parts 31 and bottomed second tubular parts 32 are provided integrally with the base plate portion 24a of the end wall 24 in the mirror housing recess 13. The first tubular parts 31 have first recesses 29 formed therein respectively, and protrude to the mirror 11 side and the upper cover 15 and lower cover 16 side from the base plate portion 24a, the first recesses 29 opening to the upper cover 15 and lower cover 16 side. The second tubular parts 32 have second recesses 30 formed therein respectively, and protrude to the mirror 11 side and the upper cover 15 and lower cover 16 side from the base plate portion 24a, the second recesses 30 opening to the mirror 11 side, the first recesses 29 and the second recesses 30 being arranged alternately.

Moreover, peripheral walls of the alternately arranged first tubular parts 31 and second tubular parts 32 are formed integrally and continuously with each other such that wall parts 33, that are part of the peripheral walls and respectively disposed between the alternately arranged first recesses 29 and second recesses 30, are formed so as to be common to the first tubular parts 31 and the second tubular parts 32.

Furthermore, the first tubular parts 31 and the second tubular parts 32 are provided integrally with the base plate portion 24a and disposed around the mirror angle adjusting unit 26, that is, around the mounting tube part 25, so as to be alternately connected with each other.

The cross sectional shape of the first tubular parts 31 and the second tubular parts 32 may be not square, but may be trapezoidal or triangular according to the relation with surrounding members.

The operation of this embodiment is now explained. The housing main body 14 is provided with the end wall 24 that closes the end part, on the side opposite to the opening end, of the mirror housing recess 13, and the bottomed first tubular parts 31 and the bottomed second tubular parts 32 are provided integrally with the flat base plate portion 24a of the end wall 24. The first tubular parts 31 have the first recesses 29 formed therein respectively, and protrude to the mirror 11 side and the upper cover 15 and lower cover 16 side from the base plate portion 24a, the first recesses 29 opening to the upper cover 15 and lower cover 16 side. The second tubular parts 32 have the second recesses 30 formed therein respectively, and protrude to the mirror 11 side and the upper cover 15 and lower cover 16 side from the base plate portion 24a, the second recesses 30 opening to the mirror 11 side, the first recesses 29 and the second recesses 30 being arranged alternately. The peripheral walls of the alternately arranged first tubular parts 31 and second tubular parts 32 are formed integrally and continuously with each other such that the wall parts 33, that are part of the peripheral walls and respectively disposed between the alternately arranged first recesses 29 and second recesses 30, are formed so as to be common to the first tubular parts 31 and the second tubular parts 32.

Therefore, while securing rigidity of the housing main body 14, it is possible to suppress increase in size of the housing main body 14 and consequently the door mirror by making relatively small a protrusion amount of the first and second tubular parts 31 and 32 protruding from the base plate portion 24a, and as a result, it is possible to achieve weight reduction and space saving of the door mirror, thereby obtaining an effect of fuel economy being improved in accordance with enhanced aerodynamic performance of the vehicle. Moreover, the width of the first and second recesses 29 and 30 can be made relatively large, and it is not necessary to form any narrow and deep groove in a mold for molding the housing main body 14, thereby improving processability of the mold. Furthermore, the first and second recesses 29 and 30 can be made to have substantially the same depth from the base plate portion 24a, so as to make a resin penetrate smoothly into the mold and reduce a molding time of the housing main body 14, thereby enabling moldability of the housing main body 14 to be enhanced.

Moreover, the mirror angle adjusting unit 26 for adjusting an angle of the mirror 11 in the up-down and left-right directions is mounted on the end wall 24, and the first tubular parts 31 and the second tubular parts 32 are provided integrally with the base plate portion 24a, and disposed around the mirror angle adjusting unit 26 so as to be alternately connected with each other. Thus, the rigidity of the housing main body 14 can be further enhanced.

An embodiment of the present invention is explained above, but the present invention is not limited to the above-mentioned embodiment and may be modified in a variety of ways as long as the modifications do not depart from the gist of the present invention.

What is claimed is:

1. A vehicle door mirror, comprising
a mirror housing that is to be disposed on each of front side doors of a vehicle and includes a resin-made housing main body and at least one cover, the housing main body including a mirror housing recess formed therein and an end wall having a flat base plate portion, an end part, on a side opposite to an opening end, of the mirror housing recess being closed by the end wall, the at least one cover covering the housing main body from the side opposite to the opening end of the mirror housing recess, a mirror facing the base plate portion and being housed in the mirror housing recess,
wherein bottomed first tubular parts and bottomed second tubular parts are provided integrally with the base plate portion of the end wall, the first tubular parts having first recesses formed therein respectively and protruding to the mirror side and the cover side from the base plate portion, the first recesses opening to the cover side, the second tubular parts having second recesses formed therein respectively and protruding to the mirror side and the cover side from the base plate portion, the second recesses opening to the mirror side, the first recesses and the second recesses being arranged alternately, and
peripheral walls of the alternately arranged first tubular parts and second tubular parts are formed integrally and continuously with each other such that wall parts, that are part of the peripheral walls and respectively disposed between the alternately arranged first recesses and second recesses, are formed so as to be common to the first tubular parts and the second tubular parts.

2. The vehicle door mirror according to claim 1, wherein a mirror angle adjusting unit for adjusting an angle of the mirror in up-down and left-right directions is mounted on the end wall, and
the first tubular parts and the second tubular parts are provided integrally with the base plate portion and disposed around the mirror angle adjusting unit so as to be alternately connected with each other.

* * * * *